United States Patent [19]

Kato et al.

[11] Patent Number: 5,499,501
[45] Date of Patent: Mar. 19, 1996

[54] ENGINE EXHAUST EMISSION CONTROL SYSTEM

[75] Inventors: Hiroaki Kato; Yuichi Shimasaki; Akihisa Saito; Takashi Komatsuda; Toshikazu Oketani; Seiji Haccho; Seiji Matsumoto; Takuya Aoki; Yukio Miyashita, all of Wako, Japan

[73] Assignee: Honda Giken Kogyo Kabushiki Kaisha, Tokyo, Japan

[21] Appl. No.: 341,175

[22] Filed: Nov. 18, 1994

[30] Foreign Application Priority Data

Nov. 19, 1993 [JP] Japan .................... 5-290534

[51] Int. Cl.⁶ ........................................ F01N 3/28
[52] U.S. Cl. ...................... 60/286; 60/297; 60/302
[58] Field of Search ................ 60/286, 297, 302

[56] References Cited

U.S. PATENT DOCUMENTS 3,295,919  1/1967  Henderson ................ 60/299
3,929,420  12/1975  Wood ......................... 60/299
5,125,231  6/1992  Patil et al. ................ 60/297
5,158,753  10/1992  Take et al. ................ 60/297
5,379,586  1/1995  Honji et al. ............... 60/297

*Primary Examiner*—Douglas Hart
*Attorney, Agent, or Firm*—Nikaido, Marmelstein, Murray & Oram

[57] ABSTRACT

In an engine exhaust emission control system, a ternary catalyst and a hydrocarbon adsorber are provided in an exhaust passageway from an engine. The ternary catalyst includes first passages through which an exhaust gas discharged from the engine flows, and second passages through which the exhaust gas which has flowed through the first passages and the hydrocarbon adsorber flows. The first and second passages are laminated to each other to enable heat exchange therebetween. The hydrocarbon adsorber is capable of being cooled by a cooling medium. Thus, it is possible to reliably prevent hydrocarbons in the exhaust gas from being released to the atmosphere during the cold start of the engine.

5 Claims, 3 Drawing Sheets

ENGINE EXHAUST EMISSION CONTROL SYSTEM

BACKGROUND OF THE INVENTION

1. Field of the Invention

The present invention relates to an engine exhaust emission control system including a ternary catalyst, and more particularly, to an engine exhaust emission control system designed so that hydrocarbons in an exhaust gas are adsorbed by a hydrocarbon adsorber, when the ternary catalyst is inactive, such as during a cold start.

2. Description of the Prior Art

A prior art engine exhaust emission control system is described in Japanese Patent Application Laid-Open No. 279719/92.

This prior art engine exhaust emission control system includes a hydrocarbon adsorber or adsorbing device provided at an upstream location in an exhaust passageway extending from an engine, while an oxidizing catalyst is provided at a downstream location, and a heat exchanger is provided between a location upstream of the hydrocarbon adsorber in the exhaust passageway and a location upstream of the oxidizing catalyst in the exhaust passageway. In this system, hydrocarbons in the exhaust gas are adsorbed by the hydrocarbon adsorber and prevented from being released to the atmosphere, when the exhaust gas is at a lower temperature. The hydrocarbons adsorbed by the hydrocarbon adsorber are desorbed from the hydrocarbon adsorber into the exhaust gas when the temperature of the exhaust gas increases. The hydrocarbons are passed through the heat exchanger where the temperature thereof increases to a level equal to or greater than a catalyst activating temperature. The hydrocarbons are thus processed in the oxidizing catalyst located downstream of the heat exchanger, and are therefore prevented from being released to the atmosphere.

However, the above prior art system has a problem because no oxidizing catalyst exists upstream of the hydrocarbon adsorber and it is therefore necessary to adsorb all of the hydrocarbons discharged from the engine by the hydrocarbon adsorber until the temperature of the oxidizing catalyst increases to a level equal to or greater than the activating temperature. This results in an increase in size of the hydrocarbon adsorber. The above prior art system includes a heat exchanger for raising the temperature of the exhaust gas, but the heat exchanger and the oxidizing catalyst are spaced apart from each other. This results in poor catalyst temperature raising effect and in a disadvantage with respect to space.

SUMMARY OF THE INVENTION

Accordingly, it is an object of the present invention to reliably prevent the releasing of hydrocarbons to the atmosphere and to provide a reduction in the size of the exhaust emission control system.

To achieve the above object, according to a first feature of the present invention, there is provided an engine exhaust emission control system, comprising a ternary catalyst including first and second passages which are laminated to enable heat exchange and which are independent from each other such that exhaust gases passing through the first and second passages are prevented from intermixing with each other; a hydrocarbon adsorber capable of being cooled by a cooling medium; and an exhaust passageway through which the exhaust gas is guided from the first passages via the hydrocarbon adsorber to the second passages.

With the above configuration, the first passages in the ternary catalyst can be activated in a short time after the start of the engine to purify the exhaust gas. Moreover, during the period before the first passages in the ternary catalyst are activated, hydrocarbons in the exhaust gas can be adsorbed by the hydrocarbon adsorber and thus prevented from being released to the atmosphere. The hydrocarbons desorbed from the hydrocarbon adsorber after the activation of the first passages in the ternary catalyst, are reliably converted by the second passages rising in temperature to a level equal to or greater than an activating temperature by the transfer of heat from the first passages. Further, since the first and second passages in the ternary catalyst are constructed in a mutually laminated manner, it is possible to enhance heat exchange efficiency and reduce the size of the ternary catalyst.

In addition to the above, according to a second feature, the engine exhaust emission control system further includes a hydrocarbon adsorber temperature sensor for detecting the temperature of the hydrocarbon adsorber; a cooling-medium control valve for controlling the flow of a cooling medium supplied to the hydrocarbon adsorber; and a control means for controlling the cooling-medium control valve to supply the cooling medium to the hydrocarbon adsorber when the temperature of the hydrocarbon adsorber detected by the hydrocarbon adsorber temperature sensor is equal to or greater than a predetermined temperature.

With such a system, it is possible not only to reliably prevent the releasing of the hydrocarbons to the atmosphere during the period before the ternary catalyst is activated, but also to save power, as compared with a system in which the cooling medium always flows.

The above and other objects, features and advantages of the invention will become apparent from the following description of preferred embodiments taken in conjunction with the accompanying drawings.

DESCRIPTION OF THE PREFERRED EMBODIMENTS

The present invention will now be described by way of preferred embodiments with reference to the accompanying drawings.

Figure 1:
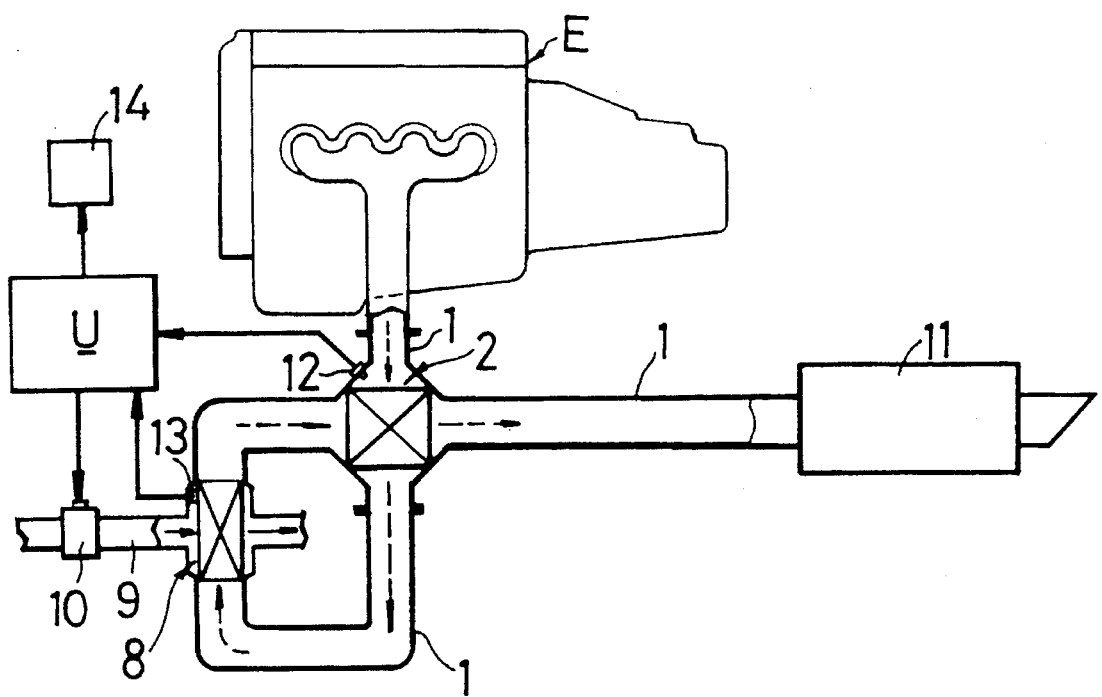
FIG. 1 is a diagrammatic illustration of an exhaust emission control system according to a first embodiment of the present invention.
Figure 2:
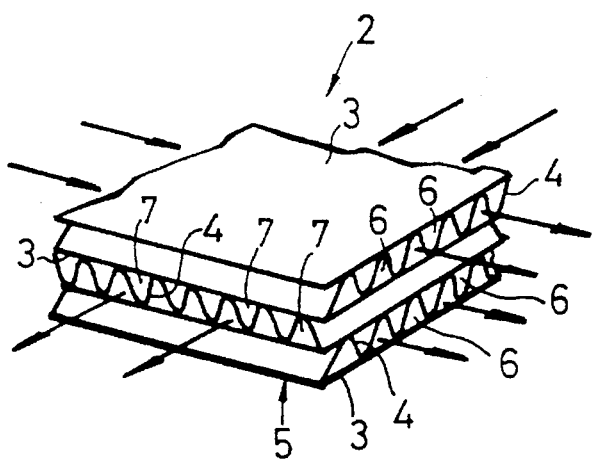
FIG. 2 is a sectional view of a ternary catalyst in the exhaust emission control system shown in FIG. 1.
Figure 3:
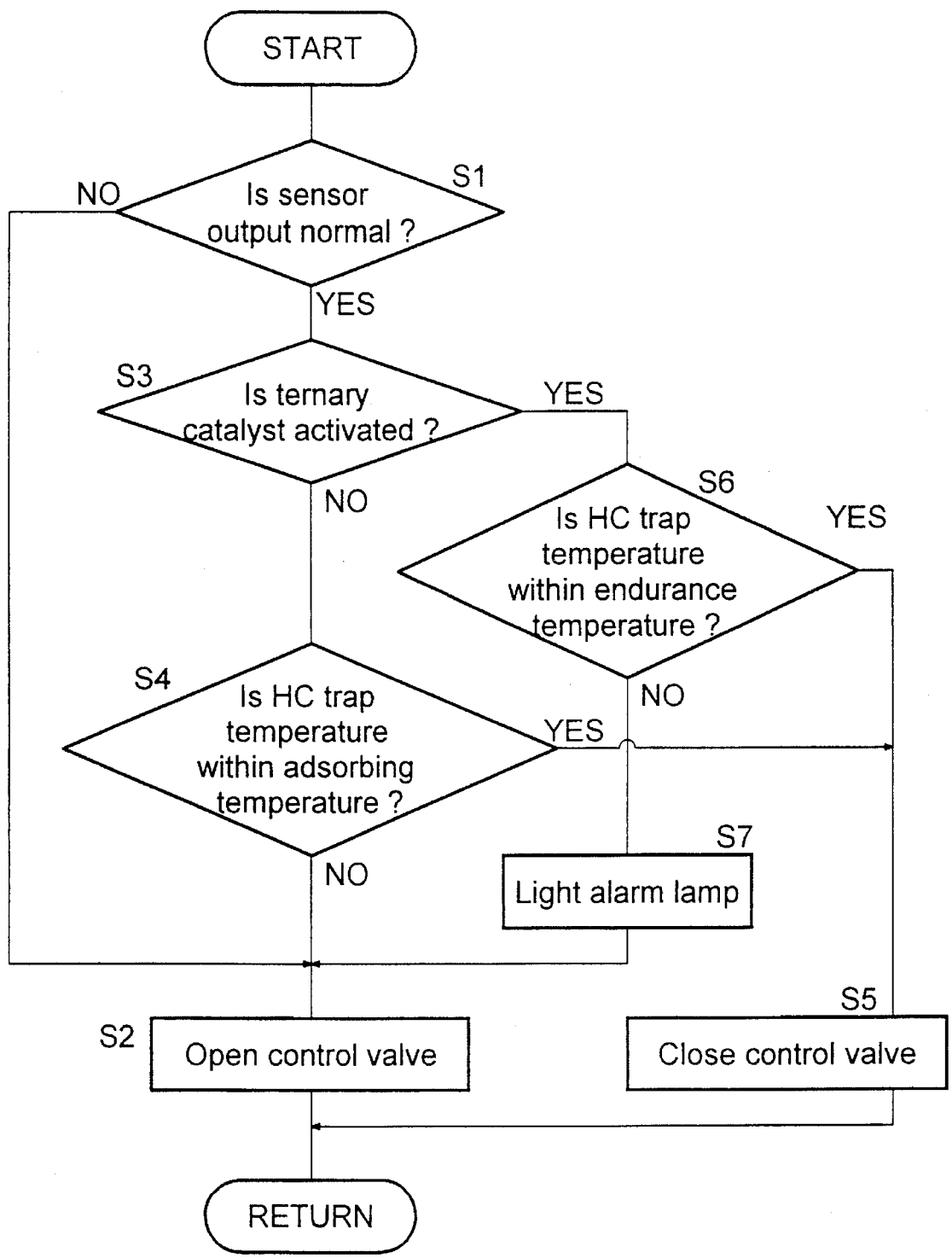
FIG. 3 is a flow chart for explaining the operation of the exhaust emission control system shown in FIG. 1.

FIGS. 1 to 3 illustrate an exhaust emission control device according to a first embodiment of the present invention.

Referring to FIG. 1, a cross-flow type ternary catalyst 2 is provided in an exhaust passageway 1 connected to an exhaust port in a serial multi-cylinder engine E of a vehicle.

Referring to FIG. 2, the cross-flow type ternary catalyst 2 includes a monolithic carrier 5 comprised of plural flat plates 3 and plural corrugated plates 4 of a porous material including alumina. The plates 3 and 4 are alternately laminated to one another. The carrier 5 is provided with a large number of first passages 6 through which exhaust gas flows in a first direction, and a large number of second passages 7 through which the exhaust gas flows in a second direction perpendicular to the first direction. A noble metal, having a catalytic function, such as platinum, rhodium, palladium or the like is carried on the surface of the carrier 5 which contacts the exhaust gas. The exhaust gases flowing through the first passages 6 and the second passages 7 are heat-exchangeable with each other through the carrier 5. The construction of the first and second passages 6 and 7 in such a laminated manner enables not only a reduction in size of the ternary catalyst 2, but also an enhancement in the heat exchange efficiency.

The exhaust gas flowing through the exhaust passageway 1 of the engine E flows first through the first passages 6 in the ternary catalyst 2 and then through an HC trap (hydrocarbon adsorber) 8 which will be described hereinafter, and is then returned to the ternary catalyst 2 and flows through the second passages 7.

Returning to FIG. 1, the HC trap 8, provided in the middle of the exhaust passageway 1, has a cross-flow structure similar to that of the ternary catalyst 2. Activated carbon or zeolite for adsorbing hydrocarbons which are unburned components in a fuel, is carried on a surface of one of the passages defined in a carrier of the HC trap 8 which is connected to the exhaust passageway 1. A coolant passage 9, through which cooling water for the engine flows, is connected to the other passages which are provided for heat exchange with the one passage. A flow rate control valve 10 is mounted in the coolant passage 9 for controlling the flow rate of the cooling medium.

A muffler 11 is mounted at a downstream location in the exhaust passage 1, i.e., downstream from the second passages 7 in the ternary catalyst 2.

Signals from a ternary catalyst temperature sensor 12 for detecting the temperature of the ternary catalyst 2 and an HC trap temperature sensor 13 for detecting the temperature of the HC trap 8 are inputted to an electronic control unit U where these signals are processed, and on the basis of results, the opening and closing of the flow rate control valve 10 and the lighting of an alarm lamp 14 are controlled.

The operation of the first embodiment having the above-described construction will be described below with reference to a flow chart in FIG. 3.

First, at step S1 it is determined whether the ternary catalyst temperature sensor 12 and the HC trap temperature sensor 13 are being operated normally. If an output value from each of the ternary catalyst temperature sensor 12 and the HC trap temperature sensor 13 is not within a predetermined range, it is determined that there is an abnormality in the sensors 12 and 13, and the flow rate control valve 10 is opened so that the HC trap 8 is cooled. Control valve 10 is opened for reasons of safety in order to prevent damage to the HC trap 8 due to overheating thereof (at step S2).

If the ternary catalyst temperature sensor 12 and the HC trap temperature sensor 13 are normal, i.e., within a predetermined range, at step S1, it is determined at step S3 on the basis of an output from the ternary catalyst temperature sensor 12, whether the ternary catalyst 2 has been activated. The activating temperature for the ternary catalyst 2 is about 300° C., and if the output from the ternary catalyst temperature sensor 12 is equal to or greater than 300° C., it is determined that the ternary catalyst 2 has been activated. If the output is less than 300° C., it is determined that the ternary catalyst 2 is still not activated.

Usually, at the cold start of the engine E, the ternary catalyst 2 is not activated, and hydrocarbons in the exhaust gas which are discharged into the exhaust passageway 1 are not converted by the ternary catalyst 2 and are thus adsorbed by the HC trap. Thus the hydrocarbons are prevented from being released to the atmosphere. If it is determined at step S3 that the ternary catalyst 2 is not activated, it is determined at step S4 on the basis of an output from the HC trap temperature sensor 13, whether the temperature of the HC trap 8 is within a hydrocarbon adsorbing temperature range.

The HC trap 8 has the characteristic that it adsorbs hydrocarbons when the temperature thereof is less than the hydrocarbon adsorbing temperature which is a predetermined temperature set to a value between 300° C. and 350° C. (not inclusive). The HC trap 8 desorbs the adsorbed hydrocarbons when the temperature of the HC trap 8 becomes higher than the predetermined temperature. Therefore, if it is determined at step S4 that the temperature of the HC trap 8 is less than the adsorbing temperature, the flow rate control valve 10 is closed at step S5. If it is determined at step S4 that the temperature of the HC trap 8 is equal to or greater than the adsorbing temperature, the flow rate control valve 10 is opened at step S2, thereby controlling the temperature of the HC trap 8 to prevent the desorption of they hydrocarbons. By opening and closing the flow rate control valve 10 on the basis of the temperature of the HC trap 8, it is possible to save power, as compared with a system in which the cooling medium is always permitted to flow.

When the temperature of the exhaust gas rises with the warming of the engine E and the ternary catalyst 2 is activated at step S3, the exhaust gas discharged from the engine E is converted as it passes through the first passages 6 in the ternary catalyst 2. Since the first passages 6 in the ternary catalyst 2 are connected to the upstream portion of the exhaust passageway 1 extending from the engine E, the temperature of the first passages 6 rises in a short time to a level equal to or greater than the activating temperature, and the ternary catalyst 2 is brought into a state in which it can adsorb the hydrocarbons, while the HC trap 8 still has hydrocarbon adsorbing power left therein.

Thus, if the ternary catalyst has been activated at step S3, it is determined at step S6, on the basis of the output from the HC trap temperature sensor 13, whether the temperature of the HC trap 8 is within an endurance temperature range (600° C.–900° C.). If the temperature of the HC trap 8 is within the endurance temperature range, the flow rate control valve 10 is closed at step S5. If the temperature of the HC trap 8 exceeds the endurance temperature range, the alarm lamp 14 is lit at step S7 to provide an alarm, and the flow rate control valve 10 is opened at step S2 to supply the cooling medium to the HC trap 8, thereby preventing a reduction in endurance due to the overheating of the HC trap 8. Even in this case, it is possible to save power by opening and closing the flow rate control valve 10 on the basis of the temperature of the HC trap 8, as compared with the case where the cooling medium flows constantly.

In this manner, while the temperature of the HC trap 8 is maintained within the endurance temperature range which is higher than the above-described adsorbing temperature, the hydrocarbons adsorbed to the HC trap 8 are desorbed and supplied to the second passages 7 in the ternary catalyst 2, where they are converted. At this time, the temperature of the second passages 7 in the ternary catalyst 2 has been sufficiently raised by the transfer of heat from the first passages 6 having a temperature near the temperature of the engine E and therefore, the exhaust gas containing the hydrocarbons can be reliably purified.

The first passages 6 in the ternary catalyst 2 is activated in a short time because it is located at a location near the exhaust port in the engine E. For this reason, the hydrocarbon adsorber 8 needs only enough capacity to adsorb the hydrocarbons discharged from the engine E within a short time. Therefore, a hydrocarbon adsorber having a smaller capacity need only be provided. This results in reducing the size of the ternary catalyst 2 by reducing the size of the lamination of the first passages 6 and the second passages 7. A reduction in size of the entire exhaust emission control system can thus be achieved, as compared with a prior art exhaust emission control system in which a usual catalyst or a catalyst which rises rapidly in temperature, is not provided upstream of the hydrocarbon adsorber, and hydrocarbons must be adsorbed during a period until a catalyst provided downstream from the hydrocarbon adsorber is activated.

Figure 4:
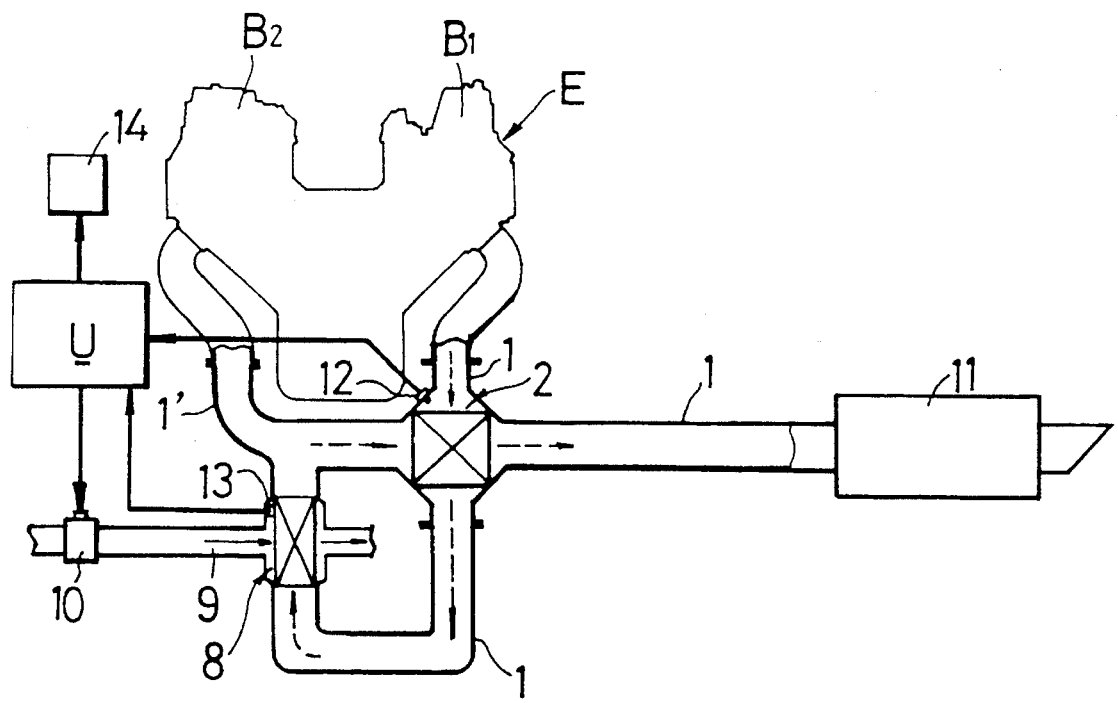
FIG. 4 is a diagrammatic illustration of an exhaust emission control system according to a second embodiment of the present invention.

A second embodiment of the present invention will now be described in connection with FIG. 4.

In the second embodiment, an engine E is a V-type multi-cylinder ending including a first cylinder bank $B_1$ and a second cylinder bank $B_2$. A normally operated cylinder is provided in the first bank $B_1$, while a cylinder having a function of stoppage when at a lower temperature after the start of the engine, is provided in the second bank $B_2$. A ternary catalyst 2, an HC trap 8 and a muffler 11 each having the same structure as in the first embodiment, are mounted in an exhaust passageway 1 extending from the first bank $B_1$. An exhaust passageway 1' extending from the second bank $B_2$ is connected between the HC trap 8 and second passages 7 in the ternary catalyst 2.

In the second embodiment, the first passages 6 and the second passages 7 in the ternary catalyst 2 are rapidly raised in temperature by exhaust gas from the first bank $B_1$ which includes the normally operated cylinders. For this reason, when the second bank $B_2$ starts to operate after the first bank $B_1$, the exhaust gas discharged from the second bank $B_2$ into the exhaust passage 1', passes through the second passages 7 in the ternary catalyst 2 which has already risen in temperature up to a level equal to or greater than the activating temperature, and is therefore purified in passages 7. Therefore, the HC trap may be of a small capacity sufficient only to be able to adsorb hydrocarbons in the exhaust gas from the first bank $B_1$.

Figure 5:
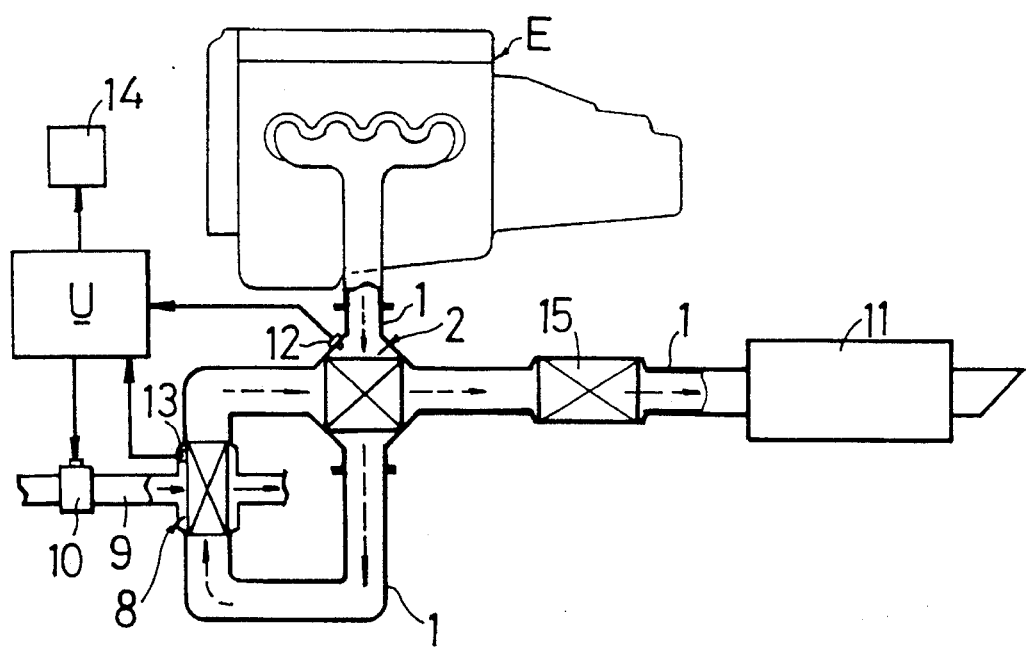
FIG. 5 is a diagrammatic illustration of an exhaust emission control system according to a third embodiment of the present invention.

A third embodiment of the present invention will now be described in connection with FIG. 5.

In the third embodiment, a second ternary catalyst 15 is provided between second passages 7 in the ternary catalyst 2 and a muffler 11.

When the first passages 6 in the ternary catalyst 2 are raised in temperature by the exhaust gas from the engine E, second passages 7 are raised in temperature by the transfer of heat from the first passages 6. Therefore, even when the temperature of the exhaust gas is lowered as a result of passing of the exhaust gas through an HC trap 8, the temperature of the exhaust gas can be raised again as it is passed through the second passages 7 in the ternary catalyst 2, and the temperature of the exhaust gas when it passes through the second ternary catalyst 15, can be maintained at a level equal to or greater than the activating temperature, thereby enhancing the purifying efficiency.

Further modifications to the exhaust systems are possible. For example, the cooling medium supplied through the coolant passage 9 is not limited to the cooling water for the engine E, and may be exclusive cooling water or cooling air. In addition, immediately after the start of the desorption of the hydrocarbon from the HC trap 8, the concentration of hydrocarbons in the exhaust gas is extremely high, but if exhaust secondary air is supplied to the exhaust passage 1 downstream from the HC trap 8, the concentration of hydrocarbons in the exhaust gas can be reduced to enhance the hydrocarbon conversion efficiency in the second passages 7 in the downstream ternary catalyst.

Further, in the second embodiment, an electrically heated catalyst may be provided upstream of the ternary catalyst 2 in the exhaust passageway 1 from the first bank $B_1$ on the side of the normally operated cylinders. In this case, the raising of the temperature of the exhaust gas on the side of the normally operated cylinders can be hastened, thereby promoting the activation of the ternary catalyst 2 to provide a further enhanced exhaust gas purifying effect.

Although the embodiments of the present invention have been described in detail, it will be understood that the present invention is not limited to these embodiments, and various modifications in design may be made without departing from the spirit and scope of the invention defined in the claims.

What is claimed is:

1. An engine exhaust emission control system comprising:
   (a) a ternary catalyst means having first and second passages, said first and second passages being laminated with respect to one another thereby enabling heat exchange between the exhaust gas flowing in said first and second passages, wherein the first and second passages are separate from each other such that there is no intermixing of the flow through said first and second passages;
   (b) a hydrocarbon adsorber coupled to said first and second passages, wherein exhaust gas flows from said first passages into said adsorber and exhaust gas flows from said adsorber into said second passages;
   (c) cooling means for cooling said hydrocarbon adsorber; and
   (d) exhaust passageway means for coupling said first passages to said adsorber and for coupling said adsorber to said second passages.

2. An exhaust emission control system as set forth in claim 1, wherein said cooling means comprises:
   (a) a first temperature sensor means for sensing the temperature of said hydrocarbon adsorber;
   (b) a cooling medium control valve for controlling the flow of a cooling medium to said hydrocarbon adsorber; and
   (c) control means coupled to the output of said first temperature sensor means and said cooling medium control valve, for operating said cooling medium control valve in response to the output of said first temperature sensor means to thereby open said control valve to supply cooling medium to said hydrocarbon adsorber when the temperature thereof exceeds said predetermined temperature.

3. An exhaust emission control system as set forth in claim 2, further including second temperature sensor means for sensing the temperature of said ternary catalyst means, wherein the output of said second temperature sensor means is coupled to said control means.

4. An exhaust emission control system as set forth in claim 1, wherein said exhaust passageway means includes a first portion for coupling a first bank of cylinders in an engine, to said first passages in said ternary catalyst means, and a second portion for coupling a second bank of cylinder in the engine to said second passages in said ternary catalyst means.

5. An exhaust emission control system as set forth in claim 1, wherein said ternary catalyst means comprises a first ternary catalyst means, said system further including a second ternary catalyst means operatively coupled to the output of said second passages of said first ternary catalyst means.

* * * * *